United States Patent [19]

McMaster et al.

[11] 4,202,681
[45] May 13, 1980

[54] VACUUM HOLDER SYSTEM AND METHOD FOR USE IN BENDING GLASS

[76] Inventors: Harold A. McMaster, 420 Water St., Woodville, Ohio 43469; John S. Nitschke, 324 E. Second St., Perrysburg, Ohio 43551

[21] Appl. No.: 968,231

[22] Filed: Dec. 11, 1978

Related U.S. Application Data

[63] Continuation-in-part of Ser. No. 872,202, Jan. 25, 1978, abandoned.

[51] Int. Cl.² .............................................. C03B 23/02
[52] U.S. Cl. ........................................ 65/104; 65/107; 65/114; 65/268; 65/273
[58] Field of Search ................ 65/104, 114, 268, 273, 65/106, 107; 294/64 R, 64 A, 64 B

[56] References Cited

U.S. PATENT DOCUMENTS

| | | | |
|---|---|---|---|
| 3,181,563 | 5/1965 | Giffen | 294/64 R X |
| 3,468,645 | 9/1969 | McMaster et al. | 65/104 X |
| 3,778,244 | 12/1973 | Nedelec et al. | 65/106 |
| 3,782,916 | 1/1974 | Powell et al. | 65/268 X |
| 4,059,426 | 11/1977 | Starr | 65/114 X |
| 4,059,427 | 11/1977 | Starr et al. | 65/114 X |
| 4,092,141 | 5/1978 | Frank et al. | 65/114 |

Primary Examiner—Arthur D. Kellogg
Attorney, Agent, or Firm—Reising, Ethington, Barnard, Perry & Brooks

[57] ABSTRACT

A system (10) and method disclosed for use in bending glass incorporate a vacuum holder (12) having a surface (28) with spaced openings (32) in which a vacuum is drawn to support a heated sheet of glass (G) and in which pressurized gas is subsequently supplied to force the glass sheet away from the holder surface. In one embodiment, operation of a control damper (24) initially communicates a vacuum blower (20) with the holder and subsequently communicates a positive pressure air blower (22) therewith to first draw the vacuum and then supply the pressurized air to the openings in the surface which is disclosed facing downwardly. During an intermediate step, the damper is positioned so that a reduced vacuum is drawn to prevent deformation of the heated glass sheet at the spaced openings in the holder surface. In an alternative embodiment, a gas jet pump (90) is used to produce the positive and vacuum pressures used in the practice of the invention. The gas jet pump produces the desired pressure condition by developing a large quantity, secondary flow of gas in response to a primary flow of gas. The direction of the secondary flow can be selectively controlled to develop either a positive pressure or vacuum pressure.

15 Claims, 7 Drawing Figures

VACUUM HOLDER SYSTEM AND METHOD FOR USE IN BENDING GLASS

CROSS REFERENCE TO RELATED APPLICATION

This is a continuation-in-part of an application filed by Harold A. McMaster et al, U.S. Ser. No. 872,202, filed Jan. 25, 1978, now abandoned, the entire disclosure of which is hereby incorporated by reference.

TECHNICAL FIELD

This invention relates to a vacuum holder system and method for use in bending glass.

Bent glass is used extensively for vehicle side and rear windows and is usually tempered after the bending in order to have good resistance to breakage as well as an aesthetically appealing shape that complements the design of the vehicle. In order to perform the bending and subsequent tempering, sheet glass must be heated to its deformation point of about 1200° to 1300° F. and then bent to the required shape before being rapidly cooled by an air spray in order to perform the tempering. Tempered glass has greatly increased mechanical strength and when broken forms relatively dull, small pieces instead of large sharp slivers as is the case with untempered glass.

The United States patent application Ser. No. 872,201 of Harold A. McMaster, Norman C. Nitschke, and John Stephen Nitschke, which was filed Jan. 25, 1978 and the entire disclosure of which is hereby incorporated by reference, discloses a vacuum holder used in bending sheet glass prior to tempering. Heated glass is conveyed below the holder which has a downwardly facing surface including spaced openings in which a vacuum is drawn. The drawn vacuum allows heated glass to be lifted and supported in engagement with the surface above the glass conveyor so that a bending mold can be moved under the holder. Upon termination of the vacuum, the glass drops onto the mold and gravity then acts on the softened glass in its heated condition to provide the bending. As this bending takes place, the mold is located within the heating chamber in which the glass is heated during its conveyance. Subsequently, the mold is moved to a tempering unit that rapidly cools the glass by an air spray to provide its tempering. In order to facilitate lifting of the glass up off the conveyor, auxiliary lifters can be used to position the glass upwardly close to the holder surface or the holder can be movable downwardly to pick up the glass and then upwardly to allow the mold to move under the holder.

BACKGROUND ART

One manner in which glass is conventionally bent and tempered is with press benders having shaped surfaces between which heated glass is clamped to shape it prior to being air cooled by a quench unit to provide tempering. U.S. Pat. Nos. 3,454,389; 3,476,542; 3,488,178; 3,600,150 and 3,951,634 disclose press bending and tempering apparatus for sheet glass.

Sheet glass is also bent and tempered by heating of planar glass sheets while supported on bending molds including movable sections. Prior to softening of the glass during heating, the sections of the mold are oriented to accommodate for the glass sheet planarity. Upon softening of the glass sheet as it is heated, the mold sections move relative to each other under the force of gravity acting on the glass sheet and on the mold sections in order to provide bending of the glass sheet prior to rapid cooling thereof which provides its tempering. Thin glass, i.e. on the order of $\frac{1}{8}''$, cannot be bent by this apparatus since it does not have sufficient weight to provide the impetus for pivoting the mold sections under the force of gravity and the thin glass would overbend before becoming hot enough to temper. U.S. Pat. Nos. 3,269,822; 3,278,287; 3,307,930 and 3,365,285 disclose this type of bending and tempering apparatus.

Heating of glass sheets prior to bending and tempering thereof has also been performed on fluid support beds as the glass is conveyed through a furnace. Normally the support bed is inclined slightly with respect to the horizontal so that gravity engages an edge of the glass with a movable frame that provides the impetus for glass movement along the bed. The fluid support from below the glass is sufficient to avoid contact between the bed and the lower surface of the glass during conveyance of the glass as it is heated and softened, but is otherwise insufficient to provide controlled vertical displacement of the glass, as the shape of the apertures in the support bed and the normal operating pressure typically provide only nominal support of the glass above the support bed of about one-eighth inch. This lack of contact prevents marring and scratching of the soft surfaces of the glass as the glass reaches its deformation temperature. However, there normally is mechanical contact with the glass during the bending after the heating in preparation for the cooling quench that tempers the glass in its bent condition. U.S. Pat. Nos. 3,497,340; 3,607,187; and 3,607,200 disclose glass bending and tempering apparatus of this type with a fluid support bed.

Vacuum forming of heated glass sheets is disclosed by U.S. Pat. No. 3,778,244 wherein sheet glass is first heated during conveyance along a roller hearth conveyor. After heating, a holder with a curved downwardly facing surface has a vacuum applied thereto about the surface to shape the glass. After shaping against the curved surface of the holder, the vacuum is terminated to drop the glass onto a mold for conveyance to a waiting operator who removes the glass from the mold. Further vacuum forming of the glass to a curved surface of the mold is also disclosed.

Other bending and tempering apparatus for sheet glass is disclosed by U.S. Pat. Nos. 2,223,124; 2,348,887; 2,646,647; and 2,085,520.

DISCLOSURE OF THE INVENTION

An object of the present invention is to provide an improved system and method for use in bending glass wherein a vacuum holder having a surface including spaced openings has a vacuum initially drawn within the openings to support a heated sheet of glass against the holder surface until pressurized gas is subsequently supplied to the openings to force the heated glass sheet away from the holder surface. Any adherence of the glass to the holder surface due to the softened glass condition is prevented from retaining the glass sheet against the surface by the pressurized air which blows the glass away from the surface. Preferably, the holder surface faces downwardly and the released glass drops downwardly onto a mold for gravity bending.

Another object of the present invention is to provide an improved system and method for use in bending glass wherein a vacuum holder having a downwardly facing surface including spaced openings has a vacuum initially drawn within the openings to support a heated sheet of glass against the holder surface, wherein the extent of vacuum drawn is subsequently reduced to prevent deformation of the heated glass sheet at the openings, and wherein the vacuum is finally terminated and pressurized gas is supplied to the openings to force the glass sheet downwardly away from the holder surface.

In the first preferred construction disclosed, a damper controls communication of a first vacuum blower and a second positive pressure air blower with the openings in the holder surface. After communicating the vacuum blower with the holder surface to initially support the glass on the holder, the damper is positioned to reduce the extent of vacuum drawn and thereby prevent deformation of the heated glass at the holder surface openings. Subsequent positioning of the damper terminates the communication of the vacuum blower with the holder surface openings and communicates the positive pressure air blower with these openings in order to provide the blowing of the glass downwardly away from the holder surface.

The damper includes a housing and vanes fixed with respect to each other projecting from a central axis of rotational support within the housing. Circumferentially spaced ducts communicate the housing with the vacuum and positive pressure air blowers and with a plenum above the spaced holder surface openings. An opening in the housing initially exhausts the pressurized air from the second blower to the atmosphere. Both blowers are then isolated from the holder and this isolation prevents heat at the holder surface from escaping to the environment. Pressure applied to the vanes by each blower and the atmosphere is balanced in both directions of rotation to facilitate rotation of the vanes.

An actuator including a digital positioner such as an electric stepper motor rotates the vanes in an accurately controlled manner. Upon vane rotation to a first position, the vacuum blower is communicated with the holder surface openings to provide vacuum pickup and support of a heated sheet of glass. The positive pressure air blower is then still blowing air out through the opening of the damper housing. Rotation of the vanes to a second position reduces the extent of communication between the vacuum blower and the holder surface openings to a limited extent and also allows some of the pressurized air from the positive pressure air blower to be drawn around one vane by the vacuum blower. Upon rotation of the vanes to a third position, the vacuum blower is isolated by the vanes from the holder surface openings and the positive pressure air blower feeds the pressurized air to the openings in order to blow the glass sheet downwardly away from the surface. The vanes are then rotated to a final position and then isolate the blowers as well as the damper housing opening from the holder surface openings. Three vanes are utilized in the preferred embodiment disclosed and a complete cycle takes place during each 120° rotation of the vanes by the stepper motor actuator.

While the system and method is shown and described in connection with gravity bending of sheet glass, it is also possible to vacuum form the glass on the holder surface. Additional gravity bending can be performed after releasing the bent glass from the holder.

The digital positioner of the actuator can be remotely programmed to facilitate operation of the damper from a control panel. All controls for the system can be located at the panel while the damper is located above a furnace in which the holder is received at a remote location from the panel. Both operation and programming for operation are performed remotely from the damper at the panel.

In a second preferred construction, the required pressures for raising and lowering the glass sheet are developed through a gas jet pump connected to the vacuum holder. The gas jet pump produces a large quantity, secondary flow of gas in response to a primary flow of gas from a pressurized source. The gas jet pump includes independent sets of gas jet openings which can be separately selected to control the direction of secondary flow. An upward secondary flow is used to create vacuum pressure, and a downward secondary flow creates positive pressure. This embodiment avoids the need for both a positive air blower and a negative air blower.

The objects, features and advantages of the present invention are readily apparent from the following description of the best mode for practicing the invention taken in connection with the accompanying drawings.

BEST MODE FOR CARRYING OUT THE INVENTION

Figure 1:
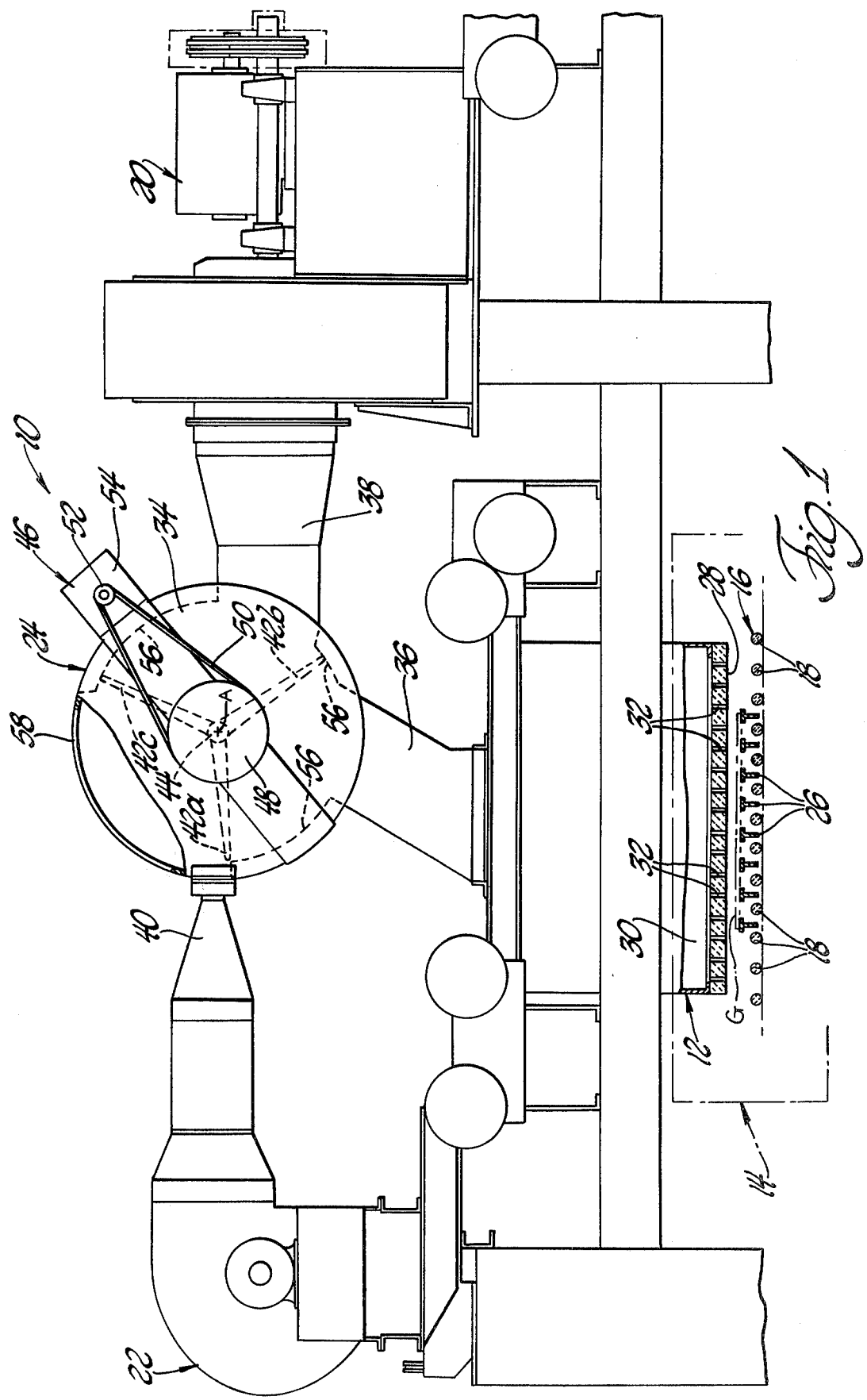
FIG. 1 is an elevation view showing a system for use in bending glass in accordance with the teachings of this invention.

Referring to FIG. 1 of the drawings, a system for use in bending glass in accordance with this invention is indicated collectively by reference numeral 10 and includes a vacuum holder 12 located within a furnace heating chamber 14. Sheets of glass G are conveyed through the heating chamber by a roller hearth conveyor 16 on horizontally extending conveyor rolls 18. When the heated sheet of glass G moves under the holder 12, the cooperable action of vacuum and positive pressure air blowers 20 and 22 selectively communicated with the holder by a control damper 24 provides for lifting and subsequent releasing of the sheet of glass by the holder. Auxiliary lifters 26 movable vertically between the conveyor rolls may be utilized to initially lift the sheet of glass G up off the rolls toward a downwardly facing planar surface 28 of the holder below a plenum 30. Spaced openings 32 in surface 28 allow a vacuum drawn within the plenum 30 to suck the glass G upwardly off of the lifters 26 and into supported engagement with the holder surface 28. The lifters 26 are then moved downwardly and a mold (not shown) is moved under the holder. Pressurized gas such as air which is supplied to the holder surface openings 32 at a positive gage pressure then blows the sheet of glass G downwardly onto the mold so that the glass can bend under the force of gravity to a curved shape of the mold. The bent sheet of glass can then be moved to a quench unit for tempering. It is also possible for the holder 12 to be movable vertically instead of using the vertically movable auxiliary lifters 26. In this and other regards for a more full understanding of the glass bending system and method involved reference should be made to the aforementioned U.S. Pat. application Ser. No. 872,201, which has been incorporated herein by reference.

Control damper 24 includes a housing 34 communicated by respective ducts 36, 38, and 40 with the holder 12, the vacuum blower 20, and the positive pressure air blower 22. Vanes 42a, b, and c are fixed on a shaft 44 within the damper housing 34 and mounted for rotation about an axis A in order to control communication of the blowers 20 and 22 with the vacuum holder 12. An actuator 46 for rotating the shaft 44 includes a sheave 48 fixed to the shaft and a continuous belt 50 trained over this sheave and over a sheave 52 of a digital positioner such as the stepper motor 54. Accurate positioning of the damper vanes 42a, b, and c can be achieved due to the use of a digital positioner. Also, the actuator 46 can be remotely programmed as well as operated due to the provision of its digital positioner.

Prior to the beginning of each cycle, the control damper 24 has its vanes oriented as shown in FIG. 1 although each vane begins successive cycles at the next adjacent counterclockwise position as will be more fully described later. Outer ends of the vanes are slidably engaged with curved surfaces 56 of the damper housing in a sealed relationship. Both the vacuum blower 20 and the positive pressure air blower 22 can continue to operate between cycles without any shutdown since the vanes 42a and 42b isolate the blowers from the plenum 30 of the vacuum holder and hence from the openings 32. Vacuum blower 20 thus draws a vacuum between the vanes 42b and 42c in this position, while the positive pressure air blower 20 delivers pressurized air at a positive gage pressure to the damper housing between the vanes 42a and 42c. A housing opening 58 feeds the pressurized air from the damper housing to the atmosphere. No heat is lost from the holder 12 to the atmosphere through this opening 58 of the damper housing due to the isolation of the holder provided by the vanes 42a and b. Also, the forces applied to the vanes by the vacuum from blower 20 and by air from blower 22 and from the atmosphere is balanced in both directions of rotation to facilitate rotation of the vanes.

Figure 2:
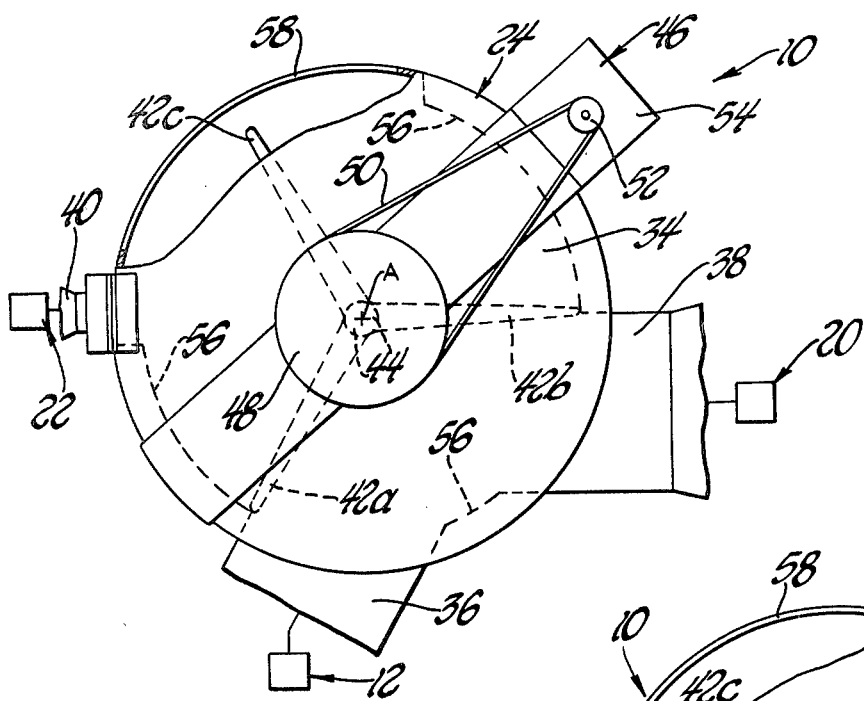
FIG. 2 is a view of a control damper shown in FIG. 1 moved to a position that communicates a vacuum blower with a vacuum holder of the system.

Upon commencement of a cycle, the digital positioner actuator 46 rotates the vanes counterclockwise to the position shown in FIG. 2 so that the vanes 42a and b cooperatively communicate the vacuum blower duct 38 and the holder duct 36. Vacuum blower 20 then draws a vacuum within the vacuum holder 12 so that glass can be lifted and supported by the holder in the manner previously described. Pressurized air from the positive pressure air blower 22 continues to be delivered to the damper housing 34 between the vanes 42a and c and exhausted to the atmosphere through the housing opening 58.

Figure 3:
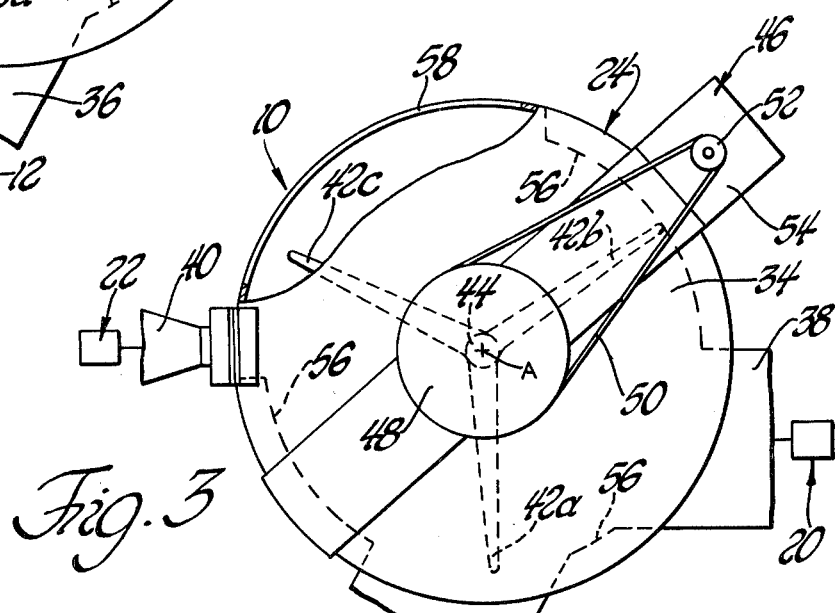
FIG. 3 is a view similar to FIG. 2 in which the damper is moved to a position that reduces the extent of vacuum drawn.

After the sheet of glass has been moved upwardly into engagement with the lower surface of the holder as previously described, the digital positioner actuator 46 rotates the damper vanes 42a, b, and c counterclockwise from the position of FIG. 2 to the position of FIG. 3. Vanes 42a and 42b continue to communicate the holder and vacuum blower ducts 36 and 38 to a limited extent so that a reduced vacuum is drawn within the holder 12. This reduced vacuum prevents the heated glass sheet from being deformed at the spaced openings 32 of the holder surface 28 shown in FIG. 1. Positive pressure air blower 22 continues to deliver pressurized air to the damper housing and some of this air is exhausted to the atmosphere through the housing opening 58 while some of the air is also sucked around the vane 42a and out through the duct 38 by the vacuum blower 20.

Figure 4:
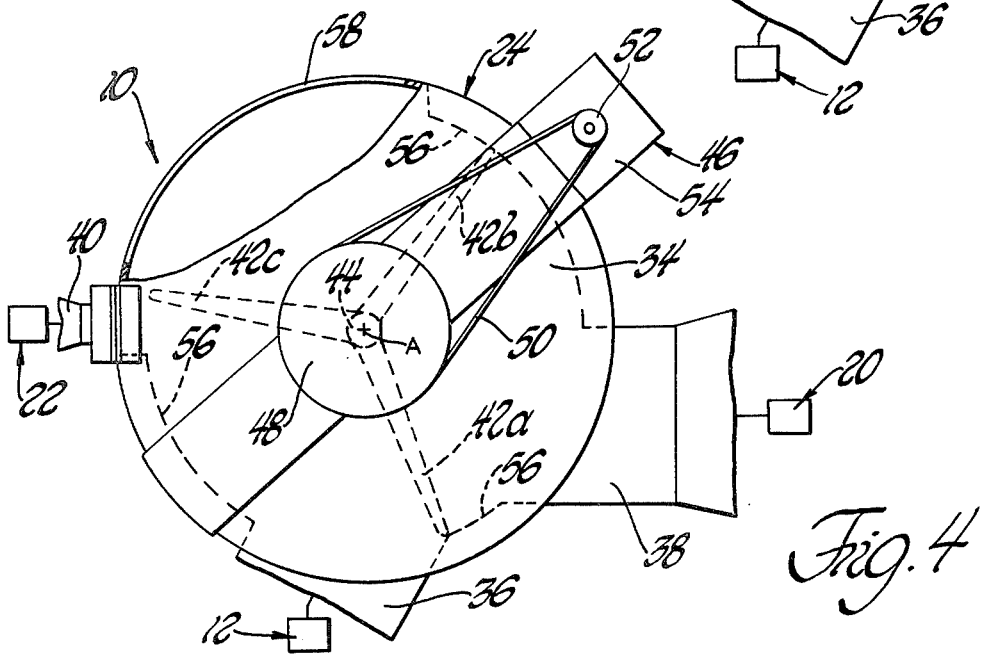
FIG. 4 is a view similar to FIG. 3 in which the damper is positioned so as to communicate a positive pressure air blower with the holder.

After the glass has been lifted and the mold moved under the holder in the manner previously described in connection with FIG. 1, digital positioner actuator 46 rotates the damper vanes 42a, b, and c counterclockwise from the position of FIG. 3 to the position of FIG. 4. Vacuum blower 20 is then isolated from the holder 12 while the vanes 42a and c communicate the duct 36 of the holder 12 and the duct 40 of the positive pressure air blower 22. Blower 22 thus supplies pressurized air at a positive gage pressure to the holder 12 so as to aid gravity in forcing the sheet of glass downwardly onto the mold. Bending of the glass to the curved shape of the mold then takes place under the force of gravity. Actuator 46 subsequently rotates the damper vanes 42a, b, and c counterclockwise so that each vane occupies the position initially occupied by the next adjacent counterclockwise vane prior to the commencement of the lifting cycle as in FIG. 1.

It should be noted that when three vanes are utilized with the control damper 24 as herein shown, three lifting cycles take place during each full revolution of the vanes, one cycle during each 120° rotation. Also, in certain instances, a proper selection of the initial vacuum drawn can eliminate the necessity for subsequently reducing the vacuum drawn in order to prevent the glass deformation at the holder surface openings 32 shown in FIG. 1. However, in other applications, the higher initial vacuum is necessary to provide the glass pickup and the reduced vacuum then must be utilized to prevent the deformation of the heated glass at the openings.

Figure 5:
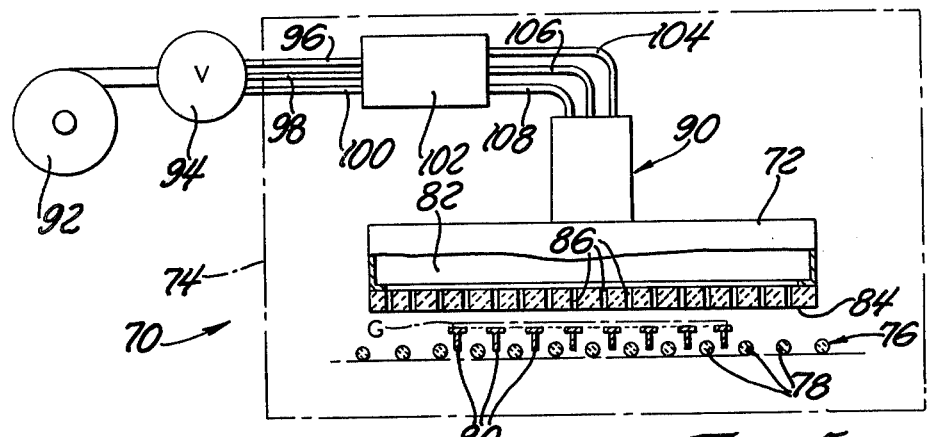
FIG. 5 is a schematic view of a second system for use in accordance with the present invention in which a gas jet pump is employed.

With reference to FIG. 5, another glass bending system in which the method of the present invention is useful is indicated generally at 70.

The glass bending system 70 includes a vacuum holder 72 located within a furnace heating chamber 74. A sheet of glass G is conveyed through the heating chamber 74 by a roller hearth conveyor, generally at 76, which is defined by a set of horizontally extending conveyor rollers 78. The glass sheet G may be lifted upwardly preparatory to engagement by the vacuum holder 72 by a set of auxiliary lifters 80 which are spaced between the conveyor rollers 78.

The vacuum holder 72 has an interior volume defining a plenum 82. The lower surface 84 of the vacuum holder 72 is planar and has formed in it a plurality of spaced apertures 86. The apertures 86 allow a vacuum drawn within the plenum 82 to draw a vacuum at the upper surface of the sheet of glass G. Conversely, by developing a positive pressure in the plenum 82, it can be communicated through the apertures to apply a positive downward force on the glass sheet G. In this manner the glass sheet G is selectively raised or lowered to control its vertical position through a bending cycle.

A gas jet pump 90 is connected to the holder 72 to provide the required pressure condition within the plenum for selective vertical positioning of the glass sheet G. The gas jet pump 90 is of the type disclosed in the application of Harold A. McMaster, et al, U.S. Ser. No. 968,232, filed concurrently herewith and whose entire disclosure is hereby incorporated by reference. However, a brief description of the gas jet pump 90 sufficient to explain its operation in the present invention is given as follows.

Figure 7:
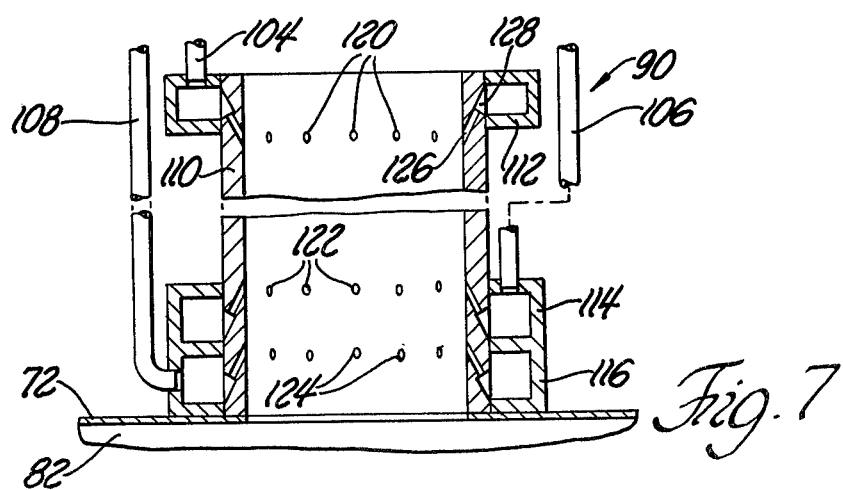
FIG. 7 is an elevation view in cross section of a gas jet pump adapted for use with the present invention.

With reference to FIG. 7, the gas jet pump 90 includes a tubular body 110. In preferred form, the tubular body is elongated and of a round cross section. A set of annular manifolds 112, 114, and 116 are mounted circumferentially on the tubular body 110. The annular manifold 112 is mounted proximate the upper end of the tubular body 110, and the annular manifolds 114 and 116 are mounted proximate the lower end in adjacency to one another. Each of the manifolds encircles the tubular body 110 and provides communication of a primary flow of air from a high pressure source to the interior of the tubular body 110 in a manner to be described presently. The primary flow of air is supplied through a respective set of supply lines 104, 106 and 108. The supply line 104 is coupled to the annular manifold 112, the supply line 106 is coupled to the annular manifold 114, and the supply line 108 is coupled to the annular manifold 116.

A plurality of jet openings 120, 122, and 124 are formed in axially spaced sets about the circumference of the tubular body 110. The set of jet openings 120 communicates the annular manifold 112 with the central opening of the tubular body 110; and, in a like manner, the set of jet openings 122 communicates the annular manifold 114 and the set of jet openings 124 communicates the annular manifold 116. In preferred form, each set has its jet opening spaced circumferentially about the tubular body 110 with co-equal axial positions.

Each jet opening has a distinct configuration which minimizes clogging and promotes an efficient secondary flow through the central opening of the tubular body 110 in response to the primary flow through the jet opening. In general, each jet opening is oriented such that it has an axial component and a circumferential component and is tangential to the inner surface of the tubular body 110. More particularly, each jet opening is formed as a counterbored hole through the wall of the tubular body 110. The counterbored hole is formed of a small hole 126 and a counterbore 128. The jet opening has its axis at an acute angle with respect to the central longitudinal axis of the tubular body 110. Moreover, the jet opening is oriented such that the inner boundary of the small hole 126 is tangential to the inner wall of tubular body at the point at which it broaches the inner wall. With this configuration, the primary flow issuing into the tubular body 110 will have an axial component and a circumferential component which combine to produce a vertical flow through the central opening of the tubular body. The angle of the pilot bore with respect to the central longitudinal axis of the tubular body 110 will determine the direction of the secondary flow through the tubular body. In the present example, the set of jet openings 120 will produce a downward secondary flow through the tubular body 110, and the sets of jet openings 122 and 124 will co-operatively produce an upward flow through the tubular body. A downward flow corresponds to positive pressure in the plenum 82 of the vacuum holder 72, and an upward secondary flow corresponds to vacuum pressure in the plenum.

Referring again to FIG. 5, the gas jet pump 90 can receive selective primary flows through the supply lines 104, 106 and 108. The primary flows through the supply lines are heated by a heat exchanger 102 located within the furnace heating chamber 74 to maintain stability of the temperature of the glass sheet G.

The high pressure source required for the operation of the gas jet pump 90 is represented by an air compressor or pump 92. The air compressor output 92 is provided to a valve 94 that permits selective control over primary flows to the gas jet pump 90. More specifically, the valve 94 has first, second and third outlet lines 96, 98 and 100 to the heating unit 102. By opening line 96 and closing lines 98 and 100, a primary flow through supply line 104 can be created to provide positive pressure in the plenum 82. Alternatively, by closing outlet line 96 and opening either or both of outlet lines 98 and 100, primary flows can be created in supply lines 106 and 108 to develop vacuum pressure within the plenum 82. The choice of one or both of the output lines 98 and 100 will be determined by the amount of vacuum pressure required; in raising the glass sheet G a greater vacuum pressure is required then to hold the glass sheet in a raised position.

Figure 6:
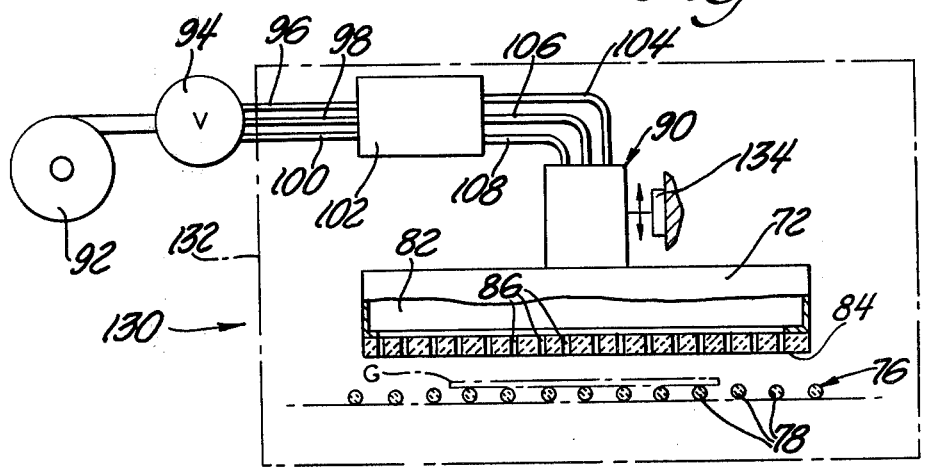
FIG. 6 is a view of a system modified from FIG. 5 in which the vacuum lifter is movable vertically.

FIG. 6 is a schematic view of a glass bending system, indicated generally at 130, which is modified in certain respects from the glass bending system 70 of FIG. 5. In this regard, wherever equivalence exists between the glass bending system 130 and the glass bending system 70, like reference numerals will be used to indicate like apparatus.

In the glass bending system 130, a glass sheet G is conveyed through a furnace heating chamber 132 on a roller hearth conveyor 76 defined by a set of horizontally extending conveyor rollers 78. In the present environment, however, instead of a set of auxiliary lifters, the vacuum holder 72 is provided with actuating means 134 which will provide controlled vertical displacement of the vacuum holder in response to a control command from the operator or logic control unit. The actuator means 134 permits the vacuum holder 72 to lower into closer proximity to the glass sheet G preparatory to lifting the glass sheet and a glass bending operation.

The gas jet pump 90 is equally applicable to this embodiment and the preceding description relating to its structure and operation applies equally herein.

It is also possible to form glass on a curved holder surface by the system and method of this invention as well as gravity forming the glass in the manner previously described. Additional gravity bending on the mold can be performed after the bent glass is released from the holder. Relatively deep bends can be performed by the combined surface forming and gravity bending.

While the best mode of the vacuum holder system and method for use in bending glass has herein been described in detail, those familiar with this art will recognize various alternatives, designs, and embodiments for practicing the present invention as defined by the following claims.

What is claimed is:

1. A system for use in bending glass comprising: a vacuum holder having a downwardly facing surface including spaced openings therein; a roller conveyor for conveying a heated sheet of glass below the vacuum holder in a vertically spaced relationship thereto; first means for providing relative vertical movement between the holder surface and a heated sheet of glass below the holder surface on the conveyor so as to position the holder surface in proximity with the heated sheet of glass; and second means for initially drawing a vacuum within the holder surface openings to support a heated glass sheet against the holder surface and for subsequently reducing the extent of vacuum drawn to prevent deformation of the heated sheet of glass at the openings in the holder surface, the first means being operable to position the holder surface with the heated sheet of glass thereon above the roller conveyor in a spaced relationship such that a mold can be moved under the holder above the conveyor, and the second means subsequently supplying positive gage pressure air to the holder surface openings to force the heated glass sheet downwardly away from the holder surface so that bending can take place on the mold.

2. A system as in claim 1 wherein said second means includes a first vacuum blower for drawing the vacuum within the holder surface openings, a second positive pressure air blower for supplying the pressurized air to the holder surface openings, and a damper that initially communicates the first vacuum blower with the holder surface openings and that subsequently communicates the second positive pressure air blower with the holder surface openings.

3. A system as in claim 2 wherein the damper includes vanes fixed with respect to each other projecting from a central axis, a housing that rotatably mounts the damper vanes about the central axis thereof, ducts that connect the damper housing with the first and second blowers and with the holder surface openings, and an actuator that rotates the damper vanes within the housing to (1) initially draw the vacuum within the holder surface openings from the first blower, (2) subsequently draw a reduced vacuum from the first blower within the holder surface openings to prevent deformation of the heated glass sheet at the openings, and (3) finally supply the pressurized air to the holder surface openings from the second blower.

4. A system as in claim 3 wherein the damper housing includes an opening to the atmosphere, and the actuator including a digital positioner that rotates the vanes, the digital positioner of the actuator locating the vanes in an initial and final position where the vanes isolate the first and second blowers as well as the damper housing opening from the holder surface openings while allowing pressurized air from the second blower to be exhausted to the atmosphere.

5. A system for use in bending glass comprising: a vacuum holder having a downwardly facing surface including spaced openings therein; a roller conveyor for conveying a heated sheet of glass below the vacuum holder in a vertically spaced relationship thereto; first means for providing relative vertical movement between the holder surface and a heated sheet of glass below the holder surface on the conveyor so as to position the holder surface in proximity with the heated sheet of glass; blower means for drawing a vacuum and supplying positive gage pressure air; and damper means for communicating the blower means with the holder surface openings to initially draw a vacuum within the holder surface openings to engage and support a heated glass sheet in proximity therewith against the downwardly facing holder surface and the damper means subsequently reducing the extent of vacuum drawn to prevent deformation of the heated sheet of glass at the openings in the holder surface, the first means being operable to position the holder surface with the heated sheet of glass thereon above the roller conveyor in a spaced relationship such that a mold can be moved under the holder above the conveyor, and the damper means finally supplying positive gage pressure air from the blower means to the holder surface openings to force the glass sheet downwardly away from the holder surface so that bending can take place on the mold.

6. A system for use in bending glass comprising: a vacuum holder having a downwardly facing surface including spaced openings therein; a roller conveyor for conveying a heated sheet of glass below the vacuum holder in a vertically spaced relationship thereto; first means for providing relative vertical movement between the holder surface and a heated sheet of glass below the holder surface on the conveyor so as to position the holder surface in proximity with the heated sheet of glass; a first vacuum blower; a second positive pressure air blower; a damper including a housing for communicating the first and second blowers with the holder surface openings; the damper having vanes projecting from a common axis about which the vanes are mounted for rotation with each other within the housing; and an actuator that rotates the damper vanes within the housing to initially communicate the vacuum blower with the holder surface openings to engage and support a heated glass sheet in proximity therewith against the downwardly facing holder surface and the actuator subsequently rotating the damper vanes to reduce the extent of vacuum drawn by the vacuum blower to prevent deformation of the heated sheet of glass at the openings in the holder surface, the first means being operable to position the holder surface with the heated sheet of glass thereon above the roller conveyor in a spaced relationship such that a mold can be moved under the holder above the conveyor, and the actuator subsequently rotating the damper vanes to finally communicate the positive pressure air blower with the holder surface openings to supply positive gage pressure air thereto so as to force the glass sheet downwardly away from the holder surface so that bending can take place on the mold.

7. A system for use in bending glass comprising: a vacuum holder having a downwardly facing surface including spaced openings therein; a conveyor for conveying a heated sheet of glass below the vacuum holder in a vertically spaced relationship thereto; a first vacuum blower; a second positive pressure air blower; a damper including a housing for communicating the first and second blowers with the holder surface openings; the damper having three vanes projecting from a common axis about which the vanes are mounted for rotation with each other within the housing; said damper housing having an opening to the atmosphere; and an actuator including a digital positioner that rotates the damper vanes within the housing to (1) initially communicate the vacuum blower with the holder surface openings to engage and support a heated glass sheet from the conveyor against the downwardly facing holder surface, (2) subsequently reduce the vacuum drawn within the holder surface openings by the vacuum blower to prevent deformation of the heated glass sheet at the openings, (3) thereafter communicate the positive pressure air blower with the holder surface openings to supply positive gage pressure air thereto so as to force the glass sheet downwardly away from the holder surface, and (4) finally isolate the first and second blowers as well as the damper housing opening from the holder surface openings while allowing pressurized air from the second blower to be exhausted to the atmosphere.

8. A method for supporting and quick releasing heated sheets of glass being conveyed for processing, the method comprising: conveying a heated sheet of glass on a roller conveyor to below a downwardly facing surface of a vacuum holder; providing relative vertical movement between the heated sheet of glass and the holder to position the sheet of glass in proximity to the holder surface; initially drawing a sufficient vacuum within spaced openings in the downwardly facing surface of the vacuum holder so as to support the heated sheet of glass in engagement therewith; then reducing the degree of vacuum drawn within the holder surface openings to prevent deformation of the heated glass sheet at the openings; positioning the holder surface with the heated sheet of glass thereon in a spaced relationship above the roller conveyor so a bending mold can move between the conveyor and the holder surface; and subsequently supplying positive gage pressure air to the holder surface openings to force the sheet of glass downwardly away from the holder surface.

9. A method for supporting and quick releasing a heated sheet of glass being conveyed for processing, the method comprising: conveying a heated sheet of glass on a roller conveyor to below a downwardly facing surface of a vacuum holder; providing relative vertical movement between the heated sheet of glass and the holder to position the sheet of glass in proximity to the holder surface; communicating a vacuum blower with spaced openings in the downwardly facing surface of the vacuum holder so as to support the heated sheet of glass in engagement therewith; then reducing the degree of vacuum drawn within the holder surface openings to prevent deformation of the heated glass sheet at the openings; positioning the holder surface with the heated sheet of glass thereon in a spaced relationship above the roller conveyor so a bending mold can move between the conveyor and the holder surface; and subsequently communicating a positive pressure air blower with the holder surface openings to force the sheet of glass downwardly away from the holder surface.

10. A system for use in bending glass comprising: a heating chamber; a conveyor for conveying glass to be heated through the heating chamber; a holder located above the conveyor within the heating chamber; the holder including a plenum and a downwardly facing surface having restricted openings communicating the plenum and the heating chamber; a gas jet pump located within the heating chamber and having a passage that communicates the holder plenum and the heating chamber; and a pressurized gas source located externally of the heating chamber and communicated with the passage of the jet pump so as to produce a primary gas flow therethrough away from the holder plenum toward the heating chamber in order to thereby induce a secondary gas flow from the plenum to the heating chamber such that a vacuum is drawn at the holder surface openings to receive a heated sheet of glass from the conveyor and support the glass sheet against the holder surface.

11. A system as in claim 10 further including a heater for heating the pressurized gas prior to introduction thereof into the gas jet pump.

12. A system as in claim 10 wherein the gas jet pump includes a set of jet openings having axial components along the passage so as to introduce the pressurized gas into the passage in order to produce the primary gas flow.

13. A system as in claim 12 wherein the gas jet pump includes a set of jet openings having axial components along the passage in the same direction as the first mentioned set of jet openings, and valve means for selectively feeding pressurized gas from the source to one or both sets of the jet openings in order to control the extent of vacuum drawn at the restricted openings in the holder surface.

14. A system as in claim 12 wherein the gas jet pump includes a set of jet openings having axial components along the passage in the opposite direction as the first mentioned set of jet openings, and valve means for alternately feeding pressurized gas from the source to one or the other of the sets of jet openings to either draw a vacuum at the surface openings or pressurize the openings to force a heated sheet of glass engaged with the holder surface downwardly away from the holder.

15. A system for use in bending glass comprising: a heating chamber; a conveyor for conveying glass to be heated through the heating chamber; a holder located above the conveyor within the heating chamber; the holder including a plenum and a downwardly facing surface having restricted openings communicating the plenum and the heating chamber; a gas jet pump located within the heating chamber and having a passage that communicates the holder plenum and the heating chamber; the pump having jet openings into the passage; said jet openings being inclined axially along the passage in a direction away from the holder plenum toward the heating chamber; a pressurized gas source located externally of the heating chamber and communicated with the jet openings of the jet pump so as to produce a primary gas flow in the jet pump passage away from the holder plenum toward the heating chamber in order to thereby induce a secondary gas flow from the plenum to the heating chamber such that a vacuum is drawn at the holder surface openings to receive a heated sheet of glass from the conveyor and support the glass sheet against the surface; and a heater for heating the pressurized gas prior to introduction thereof into the gas jet pump.

* * * * *

UNITED STATES PATENT AND TRADEMARK OFFICE
CERTIFICATE OF CORRECTION

PATENT NO. : 4,202,681
DATED : May 13, 1980
INVENTOR(S) : Harold A. McMaster et al It is certified that error appears in the above—identified patent and that said Letters Patent is hereby corrected as shown below:

Column 7, line 58

"vertical" should be --vortical--

Signed and Sealed this

Nineteenth Day of August 1980

[SEAL]

Attest:

SIDNEY A. DIAMOND

Attesting Officer

Commissioner of Patents and Tradema

UNITED STATES PATENT AND TRADEMARK OFFICE
Certificate

Patent No. 4,202,681                                          Patented May 13, 1980

Harold A. McMaster and John Stephen Nitschke

Application having been made by Harold A. McMaster and John Stephen Nitschke the inventors named in the patent above-identified, for the issuance of a certificate under the provisions of Title 35, Section 256, of the United States Code, adding the name of Norman C. Nitschke as a joint inventor, and a showing and proof of facts satisfying the requirements of the said section having been submitted, it is this 27th day of Mar., 1984, certified that the name of the said Norman C. Nitschke is hereby added to the said patent as a joint inventor with the said Harold A. McMaster and John Stephen Nitschke.

Fred W. Sherling,
*Associate Solicitor.*